United States Patent [19]

Arai

[11] 4,159,847
[45] Jul. 3, 1979

[54] SEAT FOR A MOTOR VEHICLE OR THE LIKE

[75] Inventor: Tomiji Arai, Tokorozawa, Japan

[73] Assignee: Nissan Motor Company, Limited, Japan

[21] Appl. No.: 801,396

[22] Filed: May 27, 1977

[30] Foreign Application Priority Data

Jun. 7, 1976 [JP] Japan .......................... 51/73341[U]

[51] Int. Cl.² .............................................. A47C 3/00
[52] U.S. Cl. .................................... 297/284; 297/355; 297/369
[58] Field of Search .................. 267/89; 297/284, 354, 297/355, 361, 367–369

[56] References Cited

U.S. PATENT DOCUMENTS

| 1,205,802 | 11/1916 | Silbert ................................... 297/284 |
| 2,091,899 | 8/1937 | Whedon et al. ................. 297/367 X |
| 2,118,689 | 5/1938 | Whedon et al. ...................... 297/367 |
| 3,241,879 | 3/1966 | Castello et al. ....................... 297/284 |
| 3,258,259 | 1/1966 | Bohlin .............................. 297/284 X |
| 3,938,858 | 2/1976 | Drabert et al. ...................... 297/284 |
| 4,019,777 | 4/1977 | Hayashi ................................ 297/284 |

FOREIGN PATENT DOCUMENTS

| 1914154 | 6/1971 | Fed. Rep. of Germany ........... 297/284 |
| 2064419 | 7/1972 | Fed. Rep. of Germany ........... 297/284 |
| 2343712 | 5/1974 | Fed. Rep. of Germany ........... 297/284 |
| 131717 | 10/1975 | Japan ....................................... 297/284 |

*Primary Examiner*—James C. Mitchell
*Attorney, Agent, or Firm*—Robert E. Burns; Emmanuel J. Lobato; Bruce L. Adams

[57] ABSTRACT

A spring loaded frame pivotably mounted in the backrest frame is easily unlocked by light pressure applied to a lever disposed at the side of the seat proper whereby the pressure of the seated person's back pressing against the backrest portion urges the pivotable frame to a new position, in which the pressure applied to the dorsal and lumbar regions of his or her back are substantially equal, and in which it is lockable.

7 Claims, 6 Drawing Figures

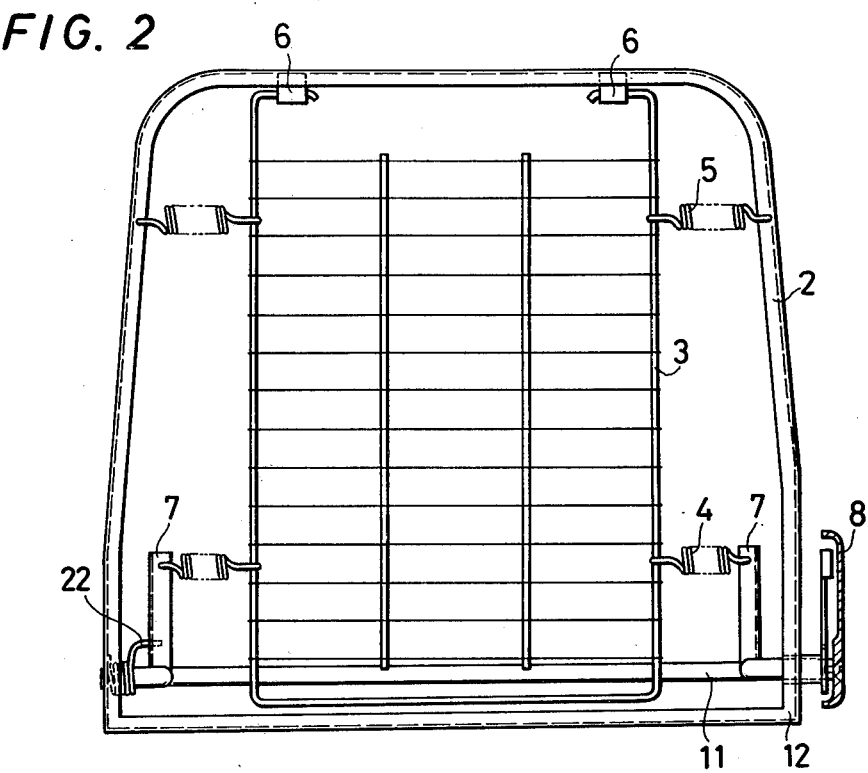
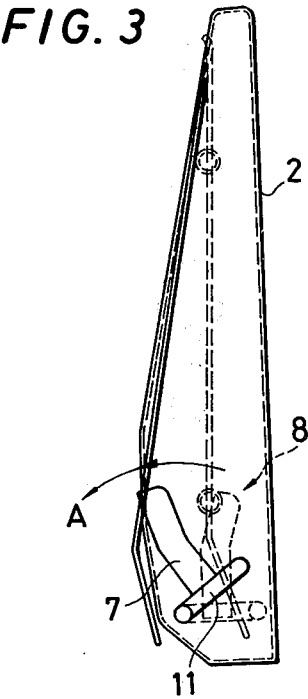
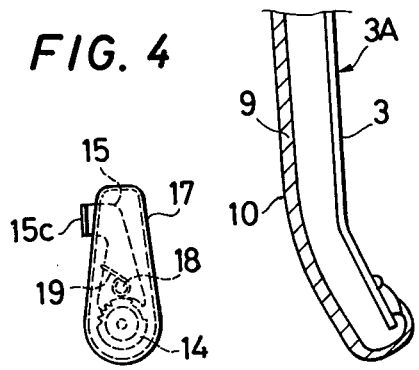

SEAT FOR A MOTOR VEHICLE OR THE LIKE

BACKGROUND OF THE INVENTION

1. Field of the Invention

This invention relates to a seat for a motor vehicle or the like and more particularly to a device which is disposed in the backrest which varies the contour of the backrest to unify the pressure applied to the seated occupants dorsal and lumbar regions.

As is well known a comfortable seat especially in a motor vehicle or the like contributes greatly to the seated occupants sense of well being and minimizes distraction due to irritation resulting from excess pressure being applied to a localized area of his or her body.

2. Description of the Prior Art

In an effort to provide the optimal seating comfort of a seated occupant, seats, especially those of motor vehicles and the like have been contoured. However there are a variety of statures and physiques and a contour perfectly suited to a tall thin person is highly likely to be rather uncomfortable to a short stout person.

Hence previous efforts to select a contour suited to all physiques has met with only partial success and thus there still remains a need to provide a seat, the contour of which can be varied to unify the pressure applied to, in particular, the dorsal and lumbar regions of person seated therein.

One attempt to solve the problem incorporates a tilting device which permits varying of the angle of the backrest with respect to the portion of the seat designed to support the gluteus maximus. However the contour of the backrest portion remains unchanged by this tilting and although aleviating the irritation somewhat, requires rather troublesome and time consuming trial and error setting of the angle; and a comfortable position when found is often ergonomically poor with respect, for example, of driving a motor vehicle, the person usually finding him or herself too far from the vehicle controls.

SUMMARY OF THE INVENTION

A seat according to the present invention has been developed which permits simple and quick variation of the contour of the backrest portion eliminating all the drawbacks of the prior art, which has a spring loaded frame pivotably mounted in the backrest frame which is easily unlocked by light pressure applied to a lever disposed at the side of the seat proper whereby the pressure of the seated person's back pressing against the backrest urges the pivotable frame to a new position in which the pressure applied to the dorsal and lumbar regions of his or her back is substantially equal thereby ensuring prolonged seated comfort.

It is therefore an object of this invention to provide a seat in which the contour of the backrest portion is variable so that substantially equal pressure is exerted on the dorsal and lumbar regions of the seated persons back.

It is also an object of this invention to provide a seat wherein the contour of the backrest is variable via simple apparatus requiring relatively little effort to operate.

It is another object of this invention to provide a seat wherein the contour of the backrest portion is varied in response to pressure exerted by the seated occupants back pressing against the backrest and pressure exerted on an operating lever operatively disposed at the side of the seat proper.

BRIEF DESCRIPTION OF THE DRAWINGS

Other objects, features and advantages of the present invention will become more clearly understood as the description proceeds taken in conjunction with the accompanying drawings in which:

FIG. 2 is an elevational view of a backrest frame and contour varying device shown in FIG. 1 but with the padding and seat cover completely omitted;

FIG. 3 is a side elevational view of the backrest frame and contour varying device of FIGS. 1 and 2;

FIG. 4 is a side elevational view of a control lever assembly used for locking and unlocking the contour varying device;

FIG. 5 is a sectional view of a portion of the seat padding and seat cover connected to the lower edge of the contour varying device.

DETAILED DESCRIPTION OF THE PREFERRED EMBODIMENT

Construction

Figure 1:
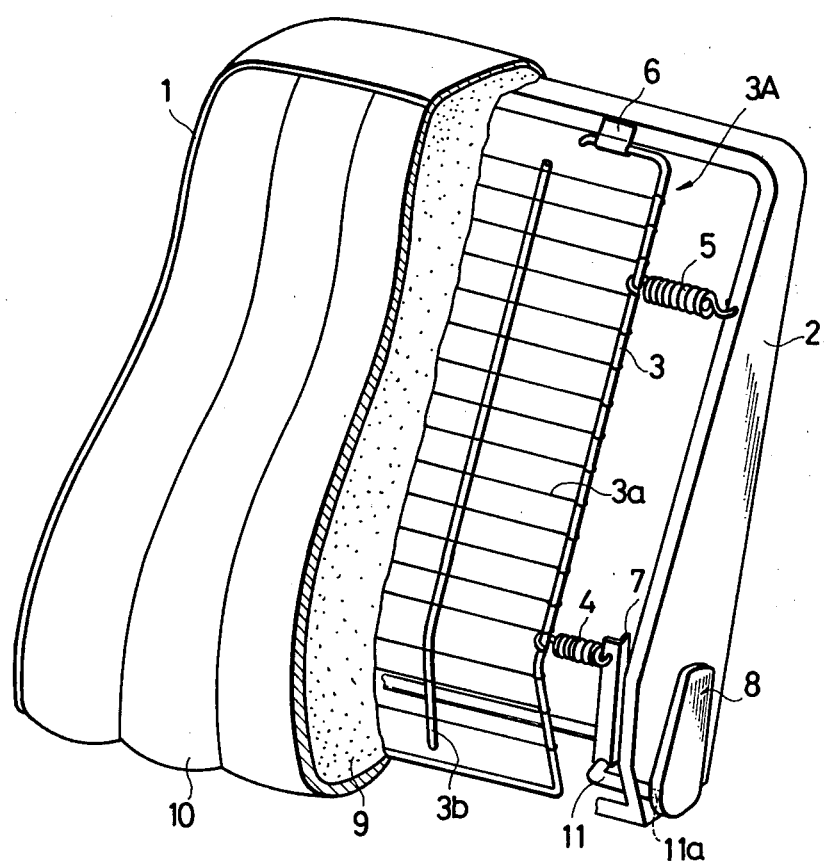
FIG. 1 is a perspective view of a seat backrest of a seat according to the present invention in which the padding and seat cover are shown partially cut away to reveal constructional features of the frame and the contour varying device.
Figure 6:
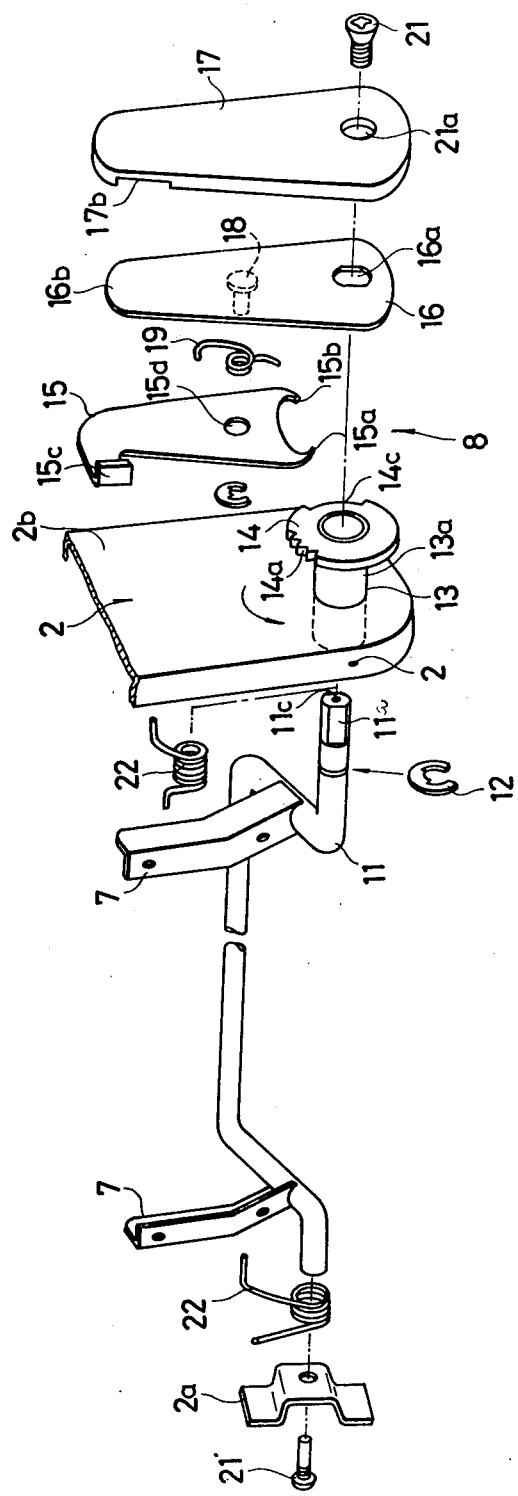
FIG. 6 is an exploded view of part of the contour varying device and backrest frame shown in FIGS. 1, 2, 3 and 4.

Let us now refer to FIGS. 1, 2 and 6 wherein the numeral 1 denotes the backrest of the seat of the present invention. Arranged within the backrest 1 is a frame 2 which as can be best seen in FIG. 2 has an inverted "U" shape and has suspended pendulously therein a frame 3 of a contour varying device generally denoted by 3A. As seen in FIGS. 1 and 2 a plurality of horizontally strung wires 3a extend tautly between the vertical portions of the frame 3. Disposed within the frame 3 are a plurality of fabric tapes 3b which interconnect the wires 3a. Two hinges 6 or clips adapted to act as hinges are connected to the upper and horizontal portion of the backrest frame 2 to hingedly support the ends of the "U" shaped frame 3. Tension springs 5 extend horizontally between the backrest frame 2 and the frame 3 at locations near the hinges 6.

Disposed through the backrest frame 2 near the bottom thereof is a crank shaped rod 11. The rod 11 is rotatably supported at its both ends by the backrest frame 2 via means which will be detailed later. Fixedly connected to the rod 11 are two bars 7 which are arranged to project upwardly in the general direction of the top of the backrest. Two tension springs 4 are connected between the ends of the two bars and the frame 3.

As best seen in FIG. 6 the left hand end of the rod is rotatably supported via a bracket 2a fixedly secured to the backrest frame 2. A self tapping screw 21' screwed into the bracket 2a and has a smooth portion which projects beyond same so as to enter a bore (no numeral) formed in the end of the rod 11. Disposed on the rod 11 inboard of the bracket 2a is a spring 22 one end of which is arranged to abut the bar 7 located closest thereto and the other end abut the flanged portion of the channel cross sectioned backrest frame 2. The function of the spring 22 is to bias the rod 11 to rotate in a direction which via the springs 4 urges the frame 3 towards the front of the seat or the front of the backrest. A spring 22 identical with that disposed on the left end of the rod (as seen in FIG. 6) is similarly disposed on the other end of the rod. The function of this spring is the same as the first. Two flat surfaces 11a are formed on the end of the rod which are engageable with a shaped hole formed through a lever 16 contained in the control lever assembly generally denoted by the numeral 8. The lever 16 is thus fixed to the rod 11 for simultaneous rotation therewith. Interposed between the lever 16 and passing through the backrest frame 2 is a bearing 13 on the end of which a lock plate 14 is formed. A bore (no numeral) formed through the bearing 13 rotatably receives the right hand end of the rod 11 therein. A set of ratchet teeth 14a are formed on the lock plate as shown. Also formed on the lock plate 14 is a notch or recess 14c. Fixedly connected at substantially the mid point of the lever 16 is a pin 18 which extends from the lever in the direction of the backrest frame 2. Rotatably supported on this pin is a lock lever 15. As can be seen the pin is arranged to pass through the lock lever 15 via a hole 15d formed therein and to have the lock lever 15 rotatably fixed thereon by a snap ring 20. Formed on the lower portion of the lock lever are two pawl members 15a and 15b. The first pawl 15a is arranged to be engageable with the ratchet teeth 14a formed on the lock plate 14. The second 15b is arranged to be slidably engageably in the recess 14c. A return spring 19 is also arranged on the pin 18 so that one end thereof engages with the edge of the lock lever 15 and the other slidably engages with the surface of the rod 11. Formed at the top of the lock lever 15 is a button 15c in the form of a projection. The return spring 19 is arranged to normally bias the lock lever in a direction to cause the first pawl to engage with the ratchet teeth and simultaneously urge the button 15c to a position forward or projected out of a cover plate 17 which is so constructed as to cover the lever 16 lock lever 15 and lock plate 14 and be fastened simply to the end of the rod 11 via a screw engageable with a thread formed in a hole formed in the end of the rod 11.

Referring now to FIG. 3 the two extreme positions of the frame 3 are shown, one in solid line, the other in broken line. As can be seen the forwardmost position of the frame 3 (shown in solid lines) is such that it is flush with the front edge of the backrest frame 2, it being rather undesirable to permit the frame to travel any further forward the lumbar portion of the backrest being urged forward, beyond comfortable limits. The rearmost position (shown in broken lines) is selected as in the case of the most forward position to be a position beyond which an undesirable amount pressure would be applied to the person's back, in this case to the dorsal region rather than the lumbar. With the aforementioned limits of travel a desirable range of adjustment is achieved whereby the contour of the backrest can be adjusted to suit virtually any body shape. It will be also noticed that the frame 3 is bent at an angle (also clearly shown in FIG. 1) which according to this invention is preferably in the region between the dorsal and lumbar regions of the seated person's back i.e. in the region of the seated person's waist. The reason for this bending is to create a contour in the surface of the backrest which form fittingly engages the seated person's waist region and facilitates the distortion of the padding and seat cover which as will be explained later is connected to the bottom edge thereof.

FIG. 4 shows a side elevation of the control lever assembly generally denoted by the numeral 8 in FIG. 6 wherein the lock lever is urged and held in a position engaging the first pawl member in engagement with the ratchet teeth. This view also clearly shows the button 15c (formed in the shape of a projection) projected out of the cover plate 17 which if urged against the biasing force of the spring 19 will engage with the lever 16 and at the same time become flush with the flanged edge of the cover plate, the lever 16 being shown in broken lines.

FIG. 5 shows details of the connection between the padding 9, seat cover 10 and the frame 3, as will be noted the padding 9 and seat cover 10 are connected to the frame 3 only at the bottom edge thereof and are connected to the backrest frame 2 at the top edge. With this arrangement the contour of the backrest may be varied without requiring additional force to stretch and deform the padding and cover, not to mention it eliminates the need to provide expansion pleats or the equivalent in the cushion comprising the cover and padding.

Operation

The operation of the afore-described arrangement is as follows: Upon pressing the button 15c with just sufficient force to overcome the biasing force of the spring 19 to move the button to a position flush with the cover plate 17 and in contact with the lever 16 the pawl member 15a is moved out of engagement with the ratchet teeth 14a and the pawl 15b is moved into sliding contact with the recess 14c formed on the lock plate 14.

If at this time no further pressure is applied to the button 15c and consequently the control lever assembly 8, the springs 22 rotate the rod 11 in a direction to tilt the bars 7 and the control lever assembly 8 toward the front of the seat. Since the springs 4 carried on the end of the bars 7 are connected to the frame 3, the latter is urged forward toward the front of the seat also. However since a person will usually be seated in the seat during this operation the frame will usually not be permitted to travel to the forwardmost position (if it is not already in same upon pressing of the button 15c). Upon equilibrium of the force exerted by the springs 22 and the person's back pressing against the backrest the button 15c may be released. The position taken by the frame 3 at this time will depend on the physique and stature of the person seated in the seat. The frame may have in fact been forced to return almost completely to the rearmost position or may be in fact in the forwardmost position or anywhere therebetween. On release of the button 15c the pawl 15a is urged into reengagement with the ratchet teeth 14a whereupon the frame is once again locked in position. If the person still experiences excessive pressure on the lumbar region of his or her back the frame 3 may be moved manually by pressing the button and exerting a slightly greater force on the control lever assembly. This additional force will be added to the force of the person's back pressing against the bracket and the frame will be moved even further to the rear to reduce the pressure applied to the lumbar region.

Thus it will be appreciated that with the application of the aforementioned additional force an even distribution of pressure over the surface of the person's back in contact with the backrest is assured.

What is claimed is:

1. A seat backrest comprising:
   a rigid main frame supporting a contourable cushion portion having a flexible protective cover and a layer of padding interposed between said cover and said frame;

a second frame hingedly mounted on said main frame proximate the upper edge of said main frame, said second frame being disposed to abut said layer of padding and disposed so that the pendulous motion thereof between first and second positions varies the contour of said protective cover and layer of padding;

a crank rotatably mounted on said main frame proximate the base of said main frame, said crank being operatively connected to said second frame so that rotation of said crank produces said pendulous motion of said second frame and vice versa;

first biasing means for biasing said crank to rotate in a direction for urging said second frame via said operative connection therebetween toward said first position and against said layer of padding; and means for disengagably locking said crank in a desired angular position with respect to said main frame so that said second frame is held in a desired position between said first second positions, said means for disengagably locking said crank comprising;

a lever connected to said crank and integrally movable therewith;

a gear fixed to said frame, said gear having a toothed portion and a recessed portion;

a manually operable lock lever mounted to said lever so as to be pivotal between first and second positions relative to said lever and having a portion arranged to abut said lever when said lock lever assumes said second position, said lock lever being formed with a first pawl and a second pawl, said first pawl lockingly engaging with said toothed portion when said lock lever assumes said first position thereof so that said lever is locked relative to said main frame and said second pawl engaging said recessed portion when said lock lever assumes said second position thereof to permit said crank to rotate between first and second angular positions whereby said second frame can pendulously move between said first and second positions thereof; and second biasing means for biasing said lock lever toward said second position thereof.

2. A seat backrest as claimed in claim 1 wherein said crank comprises:

a rod pivotally mounted on said main frame for pivotal rotation about a horizontal axis;

two spaced parallel bars mounted substantially perpendicularly to said rod; and two springs each respectively extending between a free end of one of said bars and said second frame.

3. A seat backrest as claimed in claim 1 wherein said lever is mounted on one end of said crank outboard of said main frame, said gear being fixed to an outboard surface of said main frame and having a through hole therein through which said rod is rotatably passed and said lock lever being mounted on said lever on an inboard surface thereof so as to be located between said lever and said main frame so that said first pawl and second pawl are engageable with said toothed portion and recessed portion respectively.

4. A seat backrest as claimed in claim 3 which further comprises a cover plate detachably fixed on said rod so as to cover said lever, said lock lever and said gear.

5. A seat backrest as claimed in claim 1 wherein said second frame has a plurality of wires tautly strung parallel across said second frame and a plurality of fabric tapes arranges substantially at right angles to said wires and interconnecting said wires.

6. A seat backrest as claimed in claim 3 wherein said cover plate is formed with a recess through which said portion of said lock lever which is abutable with said lever, can project so as to be manually operable.

7. a seat backrest as claimed in claim 1 wherein said second frame is bent, the location of the bend being selected to be substantially at a level defined between the dorsal and lumbar regions of the person seated thereon, a portion of said second frame below said bend being angled toward the back of said backrest with respect to a portion of said second frame defined above said bend.

* * * * *